United States Patent [19]

Lee

[11] Patent Number: 4,787,862

[45] Date of Patent: Nov. 29, 1988

[54] APPARATUS FOR ELECTRICALLY CONNECTING TWO AUDIO COMPONENTS UTILIZING DIFFERENT SIZED CONDUCTORS

[76] Inventor: Noel Lee, 47 W. Park Dr., Daly City, Calif. 94015

[21] Appl. No.: 54,014

[22] Filed: May 26, 1987

[51] Int. Cl.[4] ............................................. H01R 11/00
[52] U.S. Cl. ..................... 439/502; 439/652; 439/723
[58] Field of Search ............... 439/502, 638, 640, 646, 439/651, 652, 654, 655, 682, 686, 692, 693, 701, 708, 712, 510–514, 43–50, 52, 53, 54, 723; 330/188–195; 379/91, 101, 105

[56] References Cited

U.S. PATENT DOCUMENTS

| | | | |
|---|---|---|---|
| 3,054,078 | 9/1962 | Baschkin | 439/511 |
| 3,129,045 | 4/1964 | Dexter | 439/49 |
| 3,140,139 | 7/1964 | Urban | 439/686 |
| 3,393,399 | 7/1968 | Hollander | 439/679 |
| 3,533,053 | 10/1970 | Sosinski | 439/511 |
| 3,629,789 | 12/1971 | Sziremy | 439/651 |
| 4,384,758 | 5/1983 | Lee et al. | 439/265 |

*Primary Examiner*—David Pirlot
*Attorney, Agent, or Firm*—Warren B. Kice

[57] ABSTRACT

An apparatus for electrically connecting two audio components for transferring an audio signal between the components in which first and second connector blocks have first terminals for respectively connecting to the conventional terminals of the audio components. Each connector block has a plurality of additional terminals electrically connected to the first terminal. A plurality of electrical conductors, having different electrical current transfer characteristics, are connected between two corresponding additional terminals of the connector blocks to complete the connection.

5 Claims, 1 Drawing Sheet

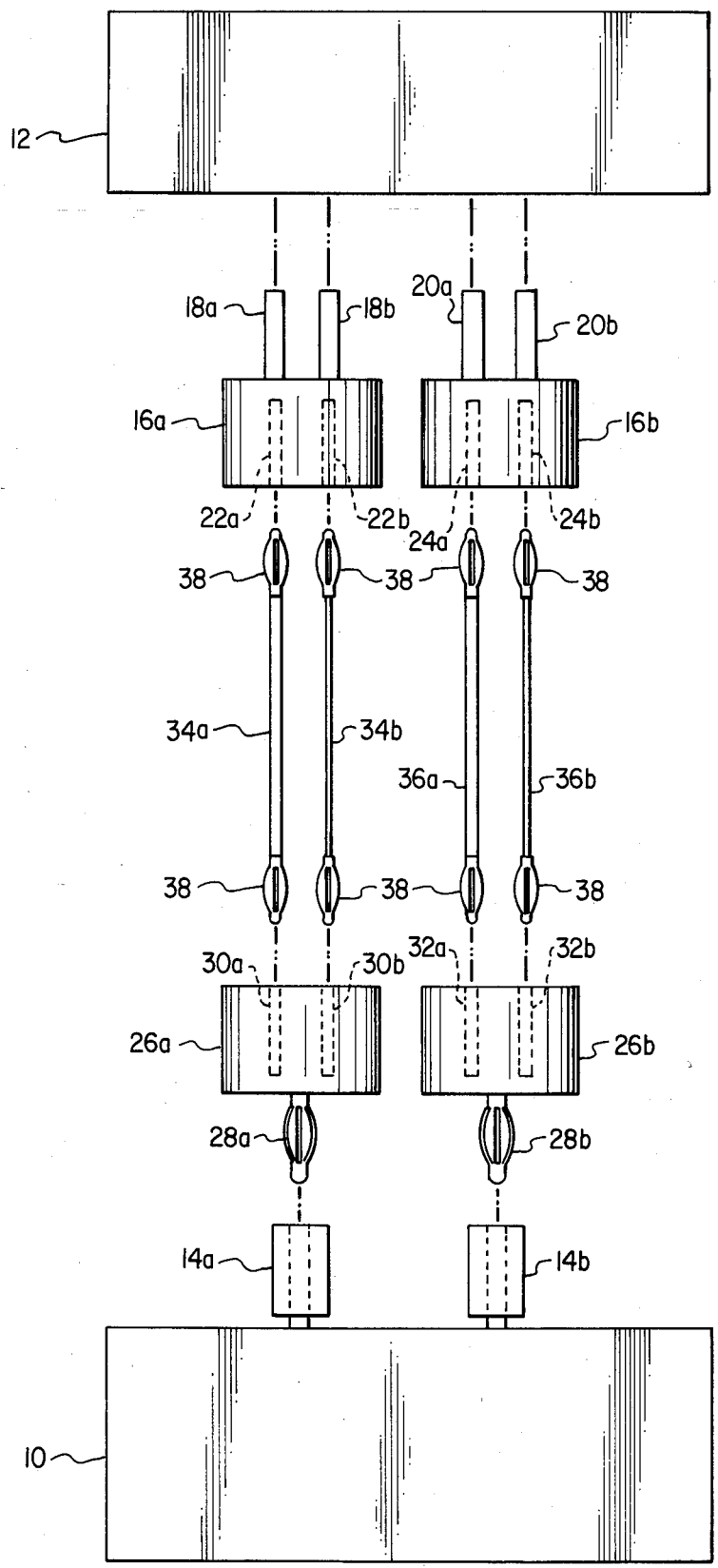

APPARATUS FOR ELECTRICALLY CONNECTING TWO AUDIO COMPONENTS UTILIZING DIFFERENT SIZED CONDUCTORS

BACKGROUND OF THE INVENTION

This invention relates to a apparatus for electrically connecting two audio components and, more particularly, to such an apparatus for transferring an audio signal between two audio components through various sized conductors.

A great majority of audio components in use today have terminals for receiving cables, or wire to electrically connect one component to another component, including a loudspeaker. The cables, or wire usually contain one conductor for the positive portion of the signal and one conductor for the negative. However, it has been discovered that the use of a single conductor in this manner limits the transfer of the signal and therefore compromises the reproduction of the signal.

SUMMARY OF THE INVENTION

It is therefore an object of the present invention to provide an apparatus for electrically connecting two audio components which permits an improved transfer of the audio signal and superior audio results.

It is a further object of the present invention to provide an apparatus of the above type in which conductors having different electrical current transfer characteristics connect the two audio components.

It is a further object of the present invention to provide an apparatus of the above type in which the conductors have different diameters.

It is a further object of the present invention to provide an apparatus of the above type which provides an electrical connection between two audio components in an efficient and simple manner.

Toward the fulfillment of these and other objects, the apparatus of the present invention includes first and second connector blocks respectively connected to the two components to be electrically connected. Each connector block includes a first terminal for electrically and mechanically connecting to the terminal of a corresponding component, and a plurality of additional terminals. A plurality of electrical conductors having different electrical current transfer characteristics are provided for connecting between the additional terminals of the respective conductor blocks.

BRIEF DESCRIPTION OF THE DRAWING

The above brief description, as well as further objects, features and advantages of the present invention will be more fully appreciated by reference to the following detailed description of the presently preferred but nonetheless illustrative embodiment in accordance with the present invention when taken in conjunction with the accompanying drawing which is an exploded top elevational view of the apparatus of the present invention.

DESCRIPTION OF THE PREFERRED EMBODIMENT

Referring specifically to the drawing, the reference numerals 10 and 12 refer in general to two audio components which are to be electrically connected to transfer an audio signal from one component to another. For example, the component 10 can be in the form of an amplifier or receiver whose output is to be electrically connected to the input of a loudspeaker 12. To this end, a pair of conventional terminals 14a and 14b, which may be in the form of conventional five-way binding posts defining a female socket, are provided on the amplifier 10 and are adapted to receive a standard "banana" male plug, as will be described. The terminals 14a and 14b are respectively connected to the positive and negative outputs of the amplifier 12, it being understood that in the case of a stereo amplifier, another pair of terminals would be provided on the amplifier.

The apparatus of the present invention includes two connector blocks 16a and 16b, respectively, adapted to be connected to the rear panel of the loudspeaker in a conventional manner, such as by wood screws, or the like. The block 16a has two connector tabs 18a and 18b projecting from one end, and the block 16b 16b has two tabs 20a and 20b projecting from one end. The tabs 18a, 18b, 20a and 20b are adapted to extend through the loudspeaker cabinet into the interior thereof where they are connected to a crossover network (not shown), or the like, for selectively distributing the signal to two different speakers housed within the cabinet, with the tabs 18a and 18b carrying the positive signal and the tabs 20a and 20b the negative signal in a conventional manner.

A pair of terminals 22a and 22b are provided in the connector block 16a and a pair of terminals 24a and 24b are provided in the connector block 16b. The terminals 22a, 22b, 24a and 24b are formed by fabricating each block 16a and 16b of an electrical conductive material, such as metal, and drilling bores in the blocks as shown.

Two additional connector blocks 26a and 26b are adapted to be connected to the amplifier 10. To this end, two male "banana" plugs 28a and 28b extend from one end of the blocks 26a and 26b, respectively, for mechanically and electrically connecting with the terminals 14a and 14b, respectively of the amplifier 10 in a conventional manner.

A pair of terminals 30a and 30b are provided in the connector block 26a and a pair of terminals 32a and 32b are provided in the block 26b. The terminals 30a, 30b, 32a and 32b are also formed by fabricating each block 26a and 26b of an electrical conductive material, such as metal, and drilling bores in the blocks.

A pair of conductors 34a and 34b extend between the conductor blocks 16a and 26a, and a pair of conductors 36a and 36b extend between the blocks 16b and 26b to mechanically and electrically connect the latter blocks. A male connector plug 38 is formed on each end of the conductors 34a, 34b, 36a and 36b. The plugs 38 on each end of the conductor 34a extend in the terminals 22a and 30a, the plugs on each end of the conductor 34b extend in the terminals 22b and 30b, the plugs on each end of the conductor 36a extend in the terminals 24a and 32a and the plugs on each end of the conductor 36b extend in the terminals 24b and 32b. The plugs 38 may be of a conventional "banana" design which are inserted into their respective terminals to complete the mechanical and electrical connection between the connector blocks 16a and 26a and between the blocks 16b and 26b, and therefore between the amplifier 10 and the loudspeaker 12.

The conductors 34a, 34b, 36a and 36b are designed to have different electrical current transfer characteristics and this is achieved in the preferred embodiment by utilizing conductors of different diameters, with the conductors 34a and 36a having the larger diameter and the conductors 34b and 36b the smaller.

In operation, the audio signal output from the amplifier 10 passes through the terminals 14a and 14b, the connector blocks 26a and 26b, the conductors 34a, 34b, 36a and 36b, the connector blocks 16a and 16b, the tabs 18a, 18b, 20a and 20b and to the cabinet of the loudspeaker 12 where it is transferred to the cross-over network of the loudspeaker for distribution to the various speakers housed within the cabinet.

As a result of the foregoing, the transfer of the audio signal is improved over that of the conventional designs which utilize only one cable, resulting in an improved reproduction of the audio signal. Although the reasons for this are not absolutely clear, it is believed that it may be due to the fact that the high frequency components of the signal tend to migrate to, and pass through, the smaller diameter conductors 34b and 36b and the larger diameter conductors 34a and 34b provide a separate path for the bass frequencies of the signal, based on the theory that the self induction in a relatively large diameter conductor is greater than in a relatively small diameter conductor and the core resistance of the larger diameter conductor at high frequencies is thus greater.

An added advantage of the apparatus of the present invention is that the sizes of the conductors 34a, 34b, 34b, 36a and 36b can be varied from the example shown and the conductors can thus be used in a variety of combinations to enable the electrical transfer characteristics between the two components to be tailored to suit individual tastes and/or to better approximate a reference standard, such as live music.

It is understood that several variations may be made to the foregoing without departing from the scope of the invention. For example, the sizes of the conductors 34a, 34b, 36a and 36b can be the same and their electrical current transfer characteristics can be varied in other ways such a by fabricating them of different materials, changing their resistance, capacitance or inductance, or the like. Also, the connector blocks 16a, 16b, 26a and 26b of the apparatus of the present invention can be designed to accommodate three or four conductors, rather than the two shown and described, in which case a corresponding number of terminals and tabs would be provided on the blocks. Further, the connector blocks can be fabricated of a dielectric material and the terminals can be formed by placing a sleeve, or the like, of an electrical conductive material into the bores and electrically connecting same to the tabs 18a, 18b, 20a and 20b and to the plugs 28a and 28b. Still further, the plugs 28a and 28b can take the form of the electrical connector disclosed in Applicant's U.S. Pat. No. 4,384,758 issued on May 24, 1983, the disclosure of which is hereby incorporated by reference. Further, the connector assembly of the present invention is not limited to providing a connection between an amplifier and a loudspeaker, but rather can be used to connect two electronic components, such as an amplifier and a tape deck, in which case the tabs 18a, 18b, 20a and 20b and the plugs 28a and 28b would be replaced by conventional "RCA" plugs which are normally provided on single cable assemblies for connecting these components.

Other modifications, changes and substitutions are intended in the foregoing disclosure and, in some instances, some features of the invention can be employed without a corresponding use of other features. Accordingly, it is appropriate that the appended claims be construed broadly and in a manner consistent with the scope of the invention.

What is claimed is:

1. Apparatus for electrically connecting two audio components for transferring an audio signal between said components; said apparatus comprising two connector blocks, one of said connector blocks having at least one terminal means for electrically and mechanically connecting to one of said components and the other connector block having at least one terminal means for electrically and mechanically connecting to said other component, each of connector blocks having at least two additional terminal means electrically connected to it one terminal means, and means electrically connecting said additional terminal means of said one connector block to said additional terminal means of said other connector block, respectively, each of said connecting means comprising a flexible electrical conductor and a male plug disposed at each end of said flexible electrical conductor and adapted to quick-detachably engage its corresponding terminal means, the sizes of said flexible electrical conductors varying so that different portions of said audio signal are transferred by different conductors.

2. The apparatus of claim 1 wherein each connector block is fabricated of an electrically conductive material to electrically connect said additional terminal means of each block to its one terminal means.

3. The apparatus of claim 2 wherein each additional terminal means is formed by a bore formed in its corresponding connector block.

4. The apparatus of claim 1 wherein one of said components is a loudspeaker having a crossover network and wherein said one terminal means of one of said connector blocks comprises a plurality of tabs for connecting to said crossover network.

5. The apparatus of claim 1 wherein there are two conductors connected between two corresponding additional terminal means of said connector blocks.

* * * * *